United States Patent
Pajuelo González et al.

(10) Patent No.: US 9,176,757 B2
(45) Date of Patent: Nov. 3, 2015

(54) METHOD, SYSTEM AND AN EXECUTABLE PIECE OF CODE FOR THE VIRTUALIZATION OF A HARDWARE RESOURCE ASSOCIATED WITH A COMPUTER SYSTEM

(71) Applicant: UNIVERSITAT POLITÉCNICA DE CATALUNYA, Barcelona (ES)

(72) Inventors: Alejandro Pajuelo González, Barcelona (ES); Javier Verdú Mulà, Barcelona (ES)

(73) Assignee: UNIVERSITAT POLITÈCNICA DE CATALUNYA (ES)

( * ) Notice: Subject to any disclaimer, the term of this patent is extended or adjusted under 35 U.S.C. 154(b) by 0 days.

(21) Appl. No.: 14/395,479

(22) PCT Filed: Apr. 18, 2013

(86) PCT No.: PCT/ES2013/070247
§ 371 (c)(1),
(2) Date: Oct. 18, 2014

(87) PCT Pub. No.: WO2013/156654
PCT Pub. Date: Oct. 24, 2013

(65) Prior Publication Data
US 2015/0135200 A1     May 14, 2015

(30) Foreign Application Priority Data

Apr. 19, 2012 (ES) .................................. P201230581

(51) Int. Cl.
*G06F 9/45* (2006.01)
*G06F 9/455* (2006.01)
(Continued)

(52) U.S. Cl.
CPC ............ *G06F 9/455* (2013.01); *G06F 9/44521* (2013.01); *G06F 9/5077* (2013.01)

(58) Field of Classification Search
None
See application file for complete search history.

(56) References Cited

U.S. PATENT DOCUMENTS

| H2202 H | 4/2007 | Conover et al. |
| 2006/0020940 A1 * | 1/2006 | Culter ........................... 718/100 |

(Continued)

FOREIGN PATENT DOCUMENTS

| WO | WO2013156654 A1 | 4/2013 |
| WO | WO2013156655 A1 | 4/2013 |

OTHER PUBLICATIONS

U.S. Appl. No. 14/395,488.
(Continued)

*Primary Examiner* — Tuan Dao
(74) *Attorney, Agent, or Firm* — Hess Patent Law Firm LLC; Robert J. Hess

(57) ABSTRACT

The invention relates to a method for the virtualization of a hardware resource associated with a computer system by an executable piece of code adapted for being injected into a process belonging to an application that is executed on an operating system comprising at least one API that is executed on the computer system. The method comprises: intercepting a call from the process to an API service related with the management of the data flow produced between the process and the hardware resource; and managing the data flow produced between the process and the hardware resource by the piece of code on the basis of the interception of the call from the process to the API service related with the management of the data flow produced between the process and the hardware resource.

19 Claims, 5 Drawing Sheets

(51) Int. Cl.
*G06F 9/50* (2006.01)
*G06F 9/445* (2006.01)

(56) References Cited

U.S. PATENT DOCUMENTS

| | | |
|---|---|---|
| 2007/0043550 A1 | 2/2007 | Tzruya |
| 2007/0183418 A1* | 8/2007 | Riddoch et al. ............... 370/389 |
| 2011/0157196 A1 | 6/2011 | Nave et al. |
| 2012/0036239 A1* | 2/2012 | Donaghey et al. ............ 709/221 |

OTHER PUBLICATIONS

Jan. 6, 2010 vol. 40 No. 7 pp. 567-584, ISSN 0038-0644 Doi: doi:10. 1002/spe.973.
Distributed Processing Techniques and Applications. PDPTA'2000 2000 CSREA Press Athens, GA USA 00/00/2000 vol. 3 pp. 1431-1437 vol. 3.
Fangzhe Chang, Ayal Itzkovitz, Vijay Karamcheti, "User-level Resource-constrained Sandboxing", USENIX Windows System Symposium, Aug. 2000.

* cited by examiner

METHOD, SYSTEM AND AN EXECUTABLE PIECE OF CODE FOR THE VIRTUALIZATION OF A HARDWARE RESOURCE ASSOCIATED WITH A COMPUTER SYSTEM

The present invention relates to a method for the virtualization of a hardware resource associated with a computer system using an executable piece of code adapted for being injected into a process belonging to an application that is executed on an operating system comprising at least one application programming interface (API) that is executed on the computer system.

The invention also relates to a system and to the executable piece of code adapted for carrying out this method.

BACKGROUND OF THE INVENTION

For some years now, basically since the cloud computing model has become consolidated, the concept of "virtualization" has been standing out within the world of computers.

Virtualization can basically be defined as the creation by means of software of a virtual version of a technological resource, such as a hardware platform, an operating system, a data storage device or other network resources, such that this resource can be divided into one or more execution environments. It is important to point out that the case in which this software is assisted by virtualization hardware technology, such as Intel-VT or AMD-V, is also possible (see Wikipedia in Spanish—http://es.wikipedia.org/wiki/Virtualizacion—for example).

One of the technological resources that is most frequently virtualized is a computer system (for example, a personal computer or a server), which allows this computer system to concurrently execute multiple instances of different operating systems. In this manner, the computer system is capable of executing different applications requiring different operating systems.

One type of virtualization is also known to allow emulating computer system hardware resources. To that end, it is necessary to install virtualization software in the computer system the objective of which is to make computer system hardware resources accessible for all installed operating systems. Another objective of this virtualization software is to coordinate access to virtualized hardware resources for the different operating systems installed in the computer system.

Despite the fact that the virtualization of hardware resources of a computer system (though applicable to any other type of virtualization) has some advantages (for example, as discussed above, it allows concurrently executing several operating systems on one and the same computer system), it also has a significant number of drawbacks.

Thus, for example, such virtualization can entail a decrease in computer system performance as a result of the overload entailed in executing the virtualization software on the computer system. Among others, the execution of the applications, which can run slower than in systems that are not virtual, can be affected.

In relation to the preceding drawback, in many cases such virtualization can virtualize resources which in no case are going to be used or in no case need to be virtualized. Thus, for example, if the keyboard of a computer system is to be virtualized so that each application being executed has a virtual keyboard, according to the state of the art it would be necessary to create as many virtual computer systems (virtual machine plus operating system) as virtual keyboards are required by the different applications being executed. This entails unnecessary system resource consumption that, as described above, affects system performance.

DESCRIPTION OF THE INVENTION

Therefore, an objective of the present invention is to provide a method for the virtualization of a certain hardware resource associated with a computer system, without having to virtualize all of its system hardware resources.

This objective is achieved according to claim 1, which provides a method for the virtualization of a hardware resource associated with a computer system by an executable piece of code adapted for being injected into a process belonging to an application that is executed on an operating system comprising at least one application programming interface (API) that is executed on the computer system, the method comprising:
  intercepting a call from the process belonging to the application to an API service related with the management of the data flow produced between the process and the hardware resource;
  managing the data flow produced between the process and the hardware resource by the piece of code on the basis of the interception of the call from the process to the API service related with the management of the data flow produced between the process and the hardware resource.

Therefore, unlike the state of the art, each application that is executed on the operating system of the computer system using the injected piece of code, can virtualize those hardware devices required for execution, without having to virtualize all of the hardware resources associated with the system. This entails a reduction in system resource consumption, as resources (the operating system or any computer system hardware resource, for example) which in no case are going to be used or in no case need to be virtualized are not virtualized. There is actually no virtualization software in the present invention for virtualizing all of the computer system resources, as occurs in the state of the art, rather the piece of code injected into each application executed on the computer system is what decides or has previously established which hardware resources it must virtualize for correct execution of the application.

Continuing with the example of virtualizing the keyboard of a computer system, the present invention simply requires creating the virtual keyboard instead of the entire computer system. The application is therefore executed directly in the actual machine, not in the virtualized machine, greatly reducing the overload introduced by virtualization: an overload, though quite small, occurs only when reading keyboard data, instead of there being a significant overload in executing each program instruction.

On the other hand, it is important to point out that the expression "management of the data flow" relates to the transmission and/or control of the data flow, such that the services which the process calls are related with the management of the data flow. So when the injected piece of code intercepts the call, the piece of code controls this management by sending the content of a virtual buffer, for example.

To achieve the objective described above, first it is necessary to intercept the calls that the process belonging to the application makes to the services related with the management of the data flow produced between the process and the hardware resource. The term "intercept" is interpreted to mean that the call from the process to the API service entails redirection to a service comprised in the piece of code, such that the piece of code itself receives the call from the process for executing this service corresponding to the API service (i.e., the call from the process does not reach the API service). With this interception, the piece of code is able to take control of the data flow between the process and the hardware resource when the process makes a request to the operating system to access same since the piece of code acts above the operating system.

Prior to this interception, the piece of code may have redirected one or more services of one or more APIs related with the management of the data flow produced between the process and the hardware resource to corresponding services comprised in the piece of code, such that, as discussed above, the call from the process is no longer made on an API service but rather on the corresponding service comprised in the piece of code.

After interception, as the piece of code receives the calls from the process and services comprised in the piece of code are the ones being executed, the piece of code can manage the data flow produced between the process and the hardware resource and thus virtualize the hardware resource, since the services comprised in the piece of code are adapted to that end.

It is important to point out that the expressions "a service", "an API", "a call" or "hardware resource" relate to at least one service, at least one API, at least one call and/or at least one hardware resource, respectively. Thus, for example, it is possible to redirect two services of one and the same API to two services comprised in the piece of code (i.e., at least two calls made by the process), or redirect a service of a first API to a first service comprised in the piece of code and a service of a second API to a second service comprised in the piece of code. Likewise, depending on the redirected services, it is possible for one and the same piece of code to be able to virtualize one or more hardware resources, such as a video card, an audio card, a hard drive, a keyboard or a mouse, depending on the needs of the application while it is being executed.

It is also important to point out that one way to inject the executable piece of code into the process is described, for example, in ["*Windows NT System-Call Hooking*", Mark Russinovich and Bryce Cogswell, *Dr. Dobb's Journal*, January 1997].

According to a preferred embodiment of the invention, the process belonging to the application can be initiated in the sleep state, and the executable piece of code can be injected into the process during this sleep state. Therefore, the method according to the invention must contemplate the possibility of reinitiating the process if said process has been initiated in the sleep state. Correct operation of the piece of code is thereby assured.

According to another embodiment of the invention, the API service can be a function, and the step of redirecting an API service related with the management of the data flow produced between the process and the hardware resource to a corresponding service comprised in the piece of code can comprise:

loading in the memory the dynamic link library comprising the API function to be redirected;

replacing, in the function pointer table for the API functions comprised in the loaded dynamic link library, the initial memory address in which the API function to be redirected is stored with the initial memory address in which the corresponding function comprised in the piece of code is stored.

The piece of code can therefore redirect one or more functions of one or more APIs to corresponding functions comprised in the piece of code, such that the piece of code can intercept calls made by the process to these functions and thus manage the data flow produced between the process and the hardware resource (or hardware resources if the application requires virtualizing more than one), which allows virtualization thereof.

Furthermore, the step of redirecting an API service related with the management of the data flow produced between the process and the hardware resource to a corresponding service comprised in the piece of code can also comprise storing in a first variable the initial memory address in which the API function to be redirected is stored, such that this API function (i.e., the original function) could be called from the executable piece of code itself in the event that it is necessary at any time while the application is being executed.

On the other hand, the API service can be an object method, and the step of redirecting an API service related with the management of the data flow produced between the process and the hardware resource to a corresponding service comprised in the piece of code can comprise:

loading in the memory the dynamic link library comprising the object method to be redirected;

verifying if the object associated with the method to be redirected is created for the first time;

in the event of a positive result in the verification, replacing, in the method pointer table for the object methods comprised in the loaded dynamic link library, the initial memory address in which the object method to be redirected is stored, with the initial memory address in which the corresponding method comprised in the piece of code is stored.

As in the case of functions, it is also possible to redirect one or more methods belonging to an object to one or more methods comprised in the piece of code, such that the piece of code can intercept the calls made by the process to these methods and thus manage the data flow produced between the process and the hardware resource.

Since, as discussed above, it is possible to redirect at least one service of at least one API, it is possible that one of the services is a function and another one of the services is a method, such that both embodiments described can become complementary for one and the same application being executed.

Furthermore, the step of redirecting an API service related with the management of the data flow produced between the process and the hardware resource to a corresponding service comprised in the piece of code can also comprise storing in a second variable the initial memory address in which the object method to be redirected is stored, such that, should it be required at any time while the application is being executed, this method (i.e., the original method) could be called from the piece of code itself.

According to another embodiment of the invention, the step of intercepting a call from the process belonging to the application to an API service related with the management of the data flow produced between the process and the hardware resource can comprise receiving a call from the process to the service comprised in the piece of code corresponding to the API service related with the management of the data flow produced between the process and the hardware resource. Depending on the direction of the data flow (i.e., process-resource or resource-process) the services comprised in the piece of code to which the process makes calls can be different.

Preferably, the step of managing the data flow produced between the process and the hardware resource can comprise:

verifying if a virtualized hardware resource corresponding with the hardware resource has been generated;

In the event of a negative result in the verification, generating the virtualized hardware resource.

For most hardware resources of a computer system, to manage the data flow produced between the process and the hardware resource it may be necessary to generate a hardware resource which virtualizes the computer system hardware resource (i.e., generating a virtual hardware resource). Therefore, depending on the computer system hardware resource, the piece of code may have to verify whether or not the corresponding virtualized hardware resource exists. In the event that it does not exist, generating this virtualized hardware resource can comprise:

generating a buffer which virtualizes the buffer associated with the hardware resource and/or generating a thread of execution emulating the behavior of the hardware resource.

The reason for generating the virtualized buffer is that most of the computer system hardware resources comprise or are associated with at least one buffer (more specifically, each hardware resource can have at least one memory area that is reserved) in which the hardware resource can store data so that it reaches the process (the process usually makes a request to obtain it), or in which the process can store data so that it reaches the resource (the resource is usually enabled to capture it), i.e., the buffer serves as a tool for exchanging data between the process and the resource. The purpose of generating the virtual or virtualized buffer is so that the memory area reserved for exchanging data between the process and the resource is a different area that is not under the control of the operating system and/or the drivers associated with the actual resources, but rather it is under the control of the piece of code. Furthermore, for each hardware resource, each application being executed that has a piece of code injected therein according to the invention can therefore have at least one buffer of its own and not one that is shared with the other applications, belonging to the hardware resource.

In some cases, once the data has been stored in the virtualized buffer, it may be necessary to inform the process that all the actions have been correctly performed. Furthermore, it may be necessary to indicate to the process how much data has been written in the buffer, either because there is space remaining in the buffer or because all the data could not be stored in the buffer and another step or other steps for data storage will be necessary.

With respect to the thread of execution, it may be necessary to generate it primarily so that it simulates the behavior of the computer system hardware resource and, among others, so that it performs suitable management of the data generated by the piece of code, through the virtualized hardware resource, and of the data generated by the process that is exchanged between them through the virtualized buffer, as discussed above. It is important to point out that the thread of execution can be represented, for example, by at least one function comprised in the piece of code, such that the execution of the thread actually entails the execution of this function.

Furthermore, the step of managing the data flow produced between the process and the hardware resource can also comprise storing in the virtualized buffer the data sent by the process to the hardware resource. The piece of code can therefore manage the data flow produced between the process and the hardware resource since the data is stored in the virtualized buffer, which is under the control of the piece of code. The destination of this data generated by the process was actually the computer system hardware resource (i.e., the actual hardware resource), but interception of the calls from the process to certain API services by the piece of code allow this data to be under its control.

On the other hand, the step of managing the data flow produced between the process and the hardware resource can comprise:

suspending the generated thread of execution emulating the behavior of the hardware resource for a predetermined time;

obtaining the data stored in the virtualized buffer, previously sent by the process to the hardware resource;

processing the obtained data.

In the event that the virtualized hardware resource has a thread of execution simulating the behavior of the computer system hardware resource, the piece of code must suspend the thread of execution for a predetermined time (usually in the order of milliseconds), so that the thread of execution then obtains the data that the process has stored in the virtualized buffer. Once this data is obtained, the thread of execution must process them just like the computer system hardware resource would. Thus, for example, if the hardware resource is an audio card, processing this data may entail converting it, for example, to mp3 format (i.e., according to the MPEG-1 audio, layer III standard), so that said data is then interpretable.

According to a preferred embodiment of the invention, the step of managing the data flow produced between the process and the hardware resource can comprise sending the processed data to a first remote computer system. Given that after the data is processed it continues to be controlled by the piece of code through the virtualized hardware resource, this data can be sent to a remote computer system (other than the computer system comprising the actual hardware resource) which actually makes use of it, although it can also be sent to the computer system itself on which the application is executed or to any other local computer system. Therefore, continuing with the audio card example, given that the piece of code has control of the audio data, said piece of code is able to make this audio data be heard through the actual audio card of the remote computer system (for example, a mobile device or terminal, such as a smartphone or a tablet) instead of making it be heard through the actual audio card associated with the computer system. Once the data is processed by the thread of execution (bear in mind that this is just al least one function comprised in the thread of execution), if such data is interpretable by the computer system audio card, there obviously must not be any problem for such data to be interpretable by the audio card of any other computer system, since such data has already been adapted to that end.

As is clearly understood, a method for the virtualization of a hardware resource associated with a computer system has been described up until now in a general manner, and also in a more specific manner on the basis of, among others, managing the data flow produced from the process belonging to the application to the hardware resource, i.e., up until now the present invention has described how the piece of code controls the data going from the process to the resource. The method of the invention when the data flow is produced between the resource (more specifically, the virtualized hardware resource) and the process belonging to the application is described below.

The method can therefore comprise managing the data flow produced from the virtualized hardware resource to the process belonging to the application.

This management of the data flow in this specific direction can comprise:

receiving data from a second remote computer system;

processing the received data;

storing the processed data in the virtualized buffer.

The piece of code can receive data at any time from a second remote computer system (although usually the first and second remote computer systems will be the same remote computer system), which data must be processed and stored in the previously created virtualized buffer so that it is accessible for the process. Therefore, in the event that the hardware resource that is being virtualized is the keyboard of the computer system for example, the piece of code (more specifically, the thread of execution simulating the behavior of the hardware resource) can receive keyboard data from the remote computer system (for example a tablet), such as data generated on the basis of a keyboard on which the user acts through the touch screen of the tablet. This data must be processed by the thread of execution and stored in the buffer.

Subsequently, when the process requires obtaining this data, it must make calls to certain API services related with the management of the data flow between the hardware resource (understood to be the actual hardware resource, since virtualization of the hardware resource is transparent for the process) and the process, these calls being intercepted by the piece of code, such that the piece of code retrieves the data stored in the virtualized buffer (not the data stored in the buffer of the computer system hardware resource, i.e., the actual hardware resource) and makes it accessible for the process, which, after having obtained it, can process it if necessary.

Therefore, the step of intercepting a call from the process belonging to the application to an API service related with the management of the data flow produced between the process and the hardware resource can comprise:
  intercepting a call from the process belonging to the application to an API service related with the management of the data flow produced from the hardware resource to the process;
whereas the step of managing the data flow produced from the virtualized hardware resource to the process belonging to the application can comprise:
  retrieving the data stored in the virtualized buffer;
  sending the retrieved data to the process.

As described above for the general situation (i.e., for the data flow between the process and the resource), the step of intercepting a call from the process to an API service related with the management of the data flow produced from the hardware resource to the process can comprise receiving a call from the process to the service comprised in the piece of code corresponding to the API service related with the management of the data flow produced from the hardware resource to the process.

Finally, the method can also comprise managing the data flow produced from the computer system hardware resource (i.e., the actual hardware resource) to the process for the purpose of assuring that the virtualized resource continues to correctly control the application, and not the actual resource. To that end, the step of managing the data flow produced between the process and the hardware resource can comprise:
  managing the data flow produced from the hardware resource to the process, which can comprise:
    verifying if there is data from the hardware resource in the buffer;
    in the event of a positive result in the verification, eliminating this data.

Since the virtualization of the computer system hardware resource that is performed is transparent for this resource, it is possible for it to continue sending data to its associated buffer, such that the buffer may at some point eventually reach capacity and, given this situation, the actual hardware resource could saturate internal structures of the operating system of the actual computer system, which could act in response to it or it could stop working correctly. To prevent this, the piece of code can verify every so often, for example, if there is data stored in the buffer, and, in the event of a positive result in the verification, eliminate such data.

According to a second aspect, the invention provides an executable piece of code that can comprise instructions for executing a method for the virtualization of a hardware resource associated with a computer system such as the one described above, this piece of code being adapted for being injected into a process belonging to an application when this application is executed on an operating system comprising at least one application programming interface (API) that is executed on the computer system.

This executable piece of code can be stored in physical storage media, such as recordable media, a computer memory, or read-only memory, or it can be carried by a carrier wave, such as an electrical or optical wave.

According to a third aspect of the invention, the present invention provides a system for the virtualization of a hardware resource associated with a computer system on which an operating system comprising at least one application programming interface is executed on which an application comprising a process is executed, the system being able to comprise:
  computer means for intercepting a call from the process belonging to the application to an application programming interface service related with the management of the data flow produced between the process and the hardware resource;
  computer means for managing the data flow produced between the process and the hardware resource by the piece of code on the basis of the interception of the call from the process to the application programming interface service related with the management of the data flow produced between the process and the hardware resource.

Preferably, the invention also provides a computer system on which an operating system that can comprise at least one application programming interface is executed, on which operating system at least one application is executed, the computer system being able to comprise a memory and at least one processor, this memory being able to store processor-executable instructions corresponding to an executable piece of code such as the one described above injected into a process belonging to the application, the instructions being able to comprise functionalities for:
  intercepting a call from the process belonging to the application to an application programming interface service related with the management of the data flow produced between the process and the hardware resource;
  managing the data flow produced between the process and the hardware resource by the piece of code on the basis of the interception of the call from the process to the application programming interface service related with the management of the data flow produced between the process and the hardware resource.

According to an embodiment of the invention, on the described computer system at least two applications can be executed on the operating system, and the memory can store processor-executable instructions corresponding to a piece of code for each application being executed.

Furthermore, the invention can also provide an application that can be executed on an operating system that is executed on a computer system, this application being able to comprise an executable piece of code such as the one that has been described above.

According to a possible embodiment of the invention, the hardware resource can be an audio card, the step of intercepting a call from the process belonging to the application to an application programming interface (API) service related with the management of the data flow produced between the process and the hardware resource can comprise intercepting a call from the process to an API service related with the management of the audio data flow produced from the process to the audio card; and the step of managing the data flow produced between the process and the hardware resource by the piece of code can comprise managing the audio data flow produced from the process to the audio card.

More specifically, the step of managing the audio data flow produced from the process to the audio card can comprise verifying if a virtualized audio card corresponding with the computer system audio card has been generated; and in the event of a negative result in the verification, generating the virtualized audio card.

The described step of generating the virtualized audio card can comprise generating at least one buffer which virtualizes the buffer associated with the computer system audio card, and generating a thread of execution emulating the behavior of the computer system audio card.

Furthermore, the step of managing the audio data flow produced between the process and the audio card can comprise storing in the virtualized buffer the audio data sent by the process to the audio card.

On the other hand, the step of managing the audio data flow produced between the process and the audio card can comprise suspending the generated thread of execution emulating the behavior of the computer system audio card for a predetermined time; obtaining the audio data stored in the virtualized buffer, previously sent by the process to the audio card, by the thread of execution; and processing the obtained audio data by the thread of execution.

This step of processing the audio data obtained from the virtualized buffer by the thread of execution can comprise mixing the data obtained from the at least one virtualized buffer, and converting the mixed audio data into an interpretable format (for example, to mp3 format).

According to another embodiment of the invention, the hardware resource can be a video card, the step of intercepting a call from the process belonging to the application to an application programming interface (API) service related with the management of the data flow produced between the process and the hardware resource can comprise intercepting a call from the process to an API service related with the management of the video data flow produced from the process to the video card; and the step of managing the data flow produced between the process and the hardware resource by the piece of code can comprise managing the video data flow produced from the process to the video card.

More specifically, the step of managing the video data flow produced from the process to the video card can comprise verifying if a virtualized video card corresponding with the computer system video card has been generated; and in the event of a negative result in the verification, generating the virtualized video card.

The step described of generating the virtualized video card can comprise generating a buffer which virtualizes the buffer associated with the computer system video card, and generating a thread of execution emulating the behavior of the computer system video card. In the case of a video card, this buffer is called Drawing Context (DC) and can be defined as a memory area in which the video card stores the resulting graphs frame-by-frame and is always associated with a window.

On the other hand, the step of managing the video data flow produced between the process and the video card can comprise suspending the generated thread of execution emulating the behavior of the computer system video card for a predetermined time; obtaining the video data (frames) stored in the virtualized DC, previously generated by the video card, by the thread of execution; and processing the obtained video data by the thread of execution.

This step of processing the video data obtained from the virtualized buffer by the thread of execution can comprise coding the frame by means of a codec, for example, H.264.

According to yet another embodiment of the invention, the hardware resource can be a data input device, such as a keyboard or a mouse. At this point it should be indicated that if the operating system that is executed on the computer system uses a message queuing system, it may also be necessary to virtualize this message queue.

To virtualize the message queue, it may be necessary to generate a buffer and a thread of execution emulating the message queuing system (i.e., sending messages to the message queue associated with the application on the basis of some data input, such as for example a pressed key) and intercepting the query and treatment function of the messages (i.e., a function (also known as a window function) that the programmer defines to determine the behavior of the application in response to a certain message) which, as discussed above, is comprised in the piece of code, in order to perform message queuing system functions. In this case, the piece of code should intercept the call from the process to the function which queries (takes the message out of the queue in order to read it) and treats (performs a certain action) the messages which can be in the message queue that the operating system has associated with the application. The function of the piece of code treating the messages of the message queue can therefore eliminate messages that are not desired to be treated by the application (i.e., which are to be ignored) or can in turn call the original function so that the application treats the message (i.e., it is intended to act in response to said message).

In the event that the hardware resource is a data input device (a mouse or a keyboard for example), the step of intercepting a call from the process belonging to the application to an application programming interface (API) service related with the management of the data flow produced between the process and the hardware resource can comprise intercepting a call from the process to an API service related with the management of the data flow produced from the input device to the process; and the step of managing the data flow produced between the process and the hardware resource by the piece of code can comprise managing the data flow produced from the input device to the process.

More specifically, the step of managing the data flow produced from the input device to the process can comprise verifying if a virtualized input device corresponding with the computer system input device has been generated; and in the event of a negative result in the verification, generating the virtualized input device.

The described step of generating the virtualized input device can comprise generating a buffer which virtualizes the buffer associated with the computer system input device, and generating a thread of execution emulating the behavior of the computer system input device.

Furthermore, the step of managing the data flow produced from the virtualized input device to the process belonging to the application can comprise receiving data from a remote computer system, this data being generated by an input device (such as a keyboard, a mouse, whether through a touch screen or not) of the remote computer system; processing the received data; and storing the processed data in the virtualized buffer.

On the other hand, the step of managing the data flow produced from the virtualized hardware device to the process belonging to the application can also comprise retrieving the data stored in the virtualized buffer; and sending the retrieved data to the process.

Finally, according to another embodiment of the invention, the hardware resource can be a storage unit, such as a hard drive; the step of intercepting a call from the process belonging to the application to an application programming interface (API) service related with the management of the data flow produced between the process and the hardware resource can comprise intercepting a call from the process to an API service related with the management of the data flow produced from the process to the storage unit; and the step of managing the data flow produced between the process and the hardware resource by the piece of code can comprise managing the data flow produced from the process to the storage unit.

More specifically, the step of managing the data flow produced from the process to the hard drive can comprise changing the directory path in which the data from the process is stored.

As discussed above, for a given application, the piece of code has to be capable of virtualizing one of the described hardware resources, or a plurality of them. For this reason, the piece of code must be adapted and must contain the instructions necessary for achieving the virtualization of one or several of these devices.

Throughout the description and the claims, the word "comprises" and variants thereof do not intend to exclude other technical features, supplements, items or steps. For those skilled in the art, further objects, advantages and features of the invention will be derived in part from the description and in part from the practice of the invention. The examples and drawings are provided by way of illustration, and they are not meant to limit the present invention. The reference numbers relating to the drawings and placed in parentheses in a claim are intended only to try to improve understanding of the claim and must not be interpreted as limiting the scope of protection of the claim. Furthermore, the present invention covers all the possible combinations of particular and preferred embodiments herein indicated.

BRIEF DESCRIPTION OF THE DRAWINGS

To better understand what has been described above, drawings schematically depicting practical embodiments by way of non-limiting example are attached.

In the drawings.

DESCRIPTION OF A PREFERRED EMBODIMENT OF THE INVENTION

The description of a method and of an executable piece of code according to the invention for the virtualization of a hardware resource associated with a computer system will be provided below. An operating system comprising at least one application programming interface (API) is installed on this computer system. The executable piece of code described is adapted for being injected into a process belonging to an application that is being executed on the described operating system.

Figure 1:
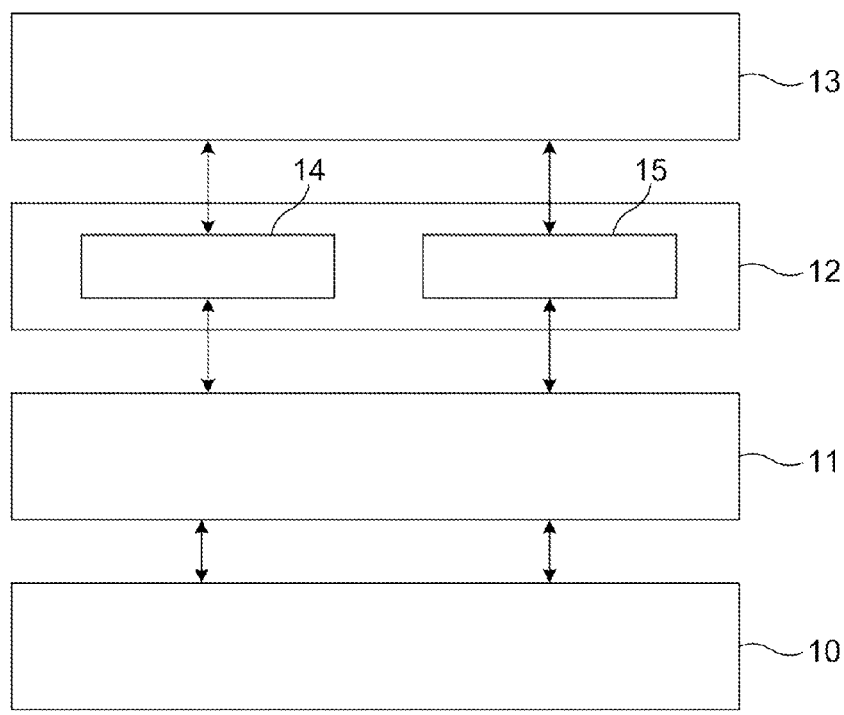
FIG. 1 is a block diagram depicting the layers of execution of an application on a computer system, according to the state of the art.

FIG. 1 shows a diagram depicting the layers of execution of an application (for example, a game) on a computer system (for example, a personal computer, a server, etc.), according to the state of the art.

In this diagram, the lowest level layer 10 represents the computer system hardware resources, such as the microprocessor (CPU), the memory, the graphic processing unit (GPU), the keyboard, the mouse, the video card, the audio card, and the hard drives, among others.

In a second layer 11 arranged in an upper level, there is located the operating system, having the drivers necessary for two-way communication and interaction (being able to send and/or receive information about these resources, such as control signals 14 or data 15) with the resources of the lower layer 10.

In a third layer 12 arranged above the layer 11 representing the operating system, there are located application programming interfaces (better known as APIs), both those that are comprised in the operating system and those resulting from the installation of the drivers of a resource of the lower layer 10. These APIs are usually implemented in dynamic link libraries, regardless of the operating system used. Communication between the layer 12 comprising the APIs and the layer 11 representing the operating system is also two-way communication, being able to exchange both control signals 14 and data 15.

Finally, FIG. 1 also shows a fourth layer or highest level layer 13 depicting the application being executed. While it is being executed, this application accesses the layer 12 representing the APIs, exchanging both control signals and data.

Therefore, according to this configuration, if, for example, the application being executed 13 requires the generation of a window on the display screen of the computer system on which it is being executed, the application must access certain services of the APIs 12 (either functions or methods) intended for generating windows. To be able to generate the window on the screen, these services need to exchange information (control signals and data) with the operating system 11, which has the necessary tools (i.e., drivers) for communicating with the screen 10 and thus causing the generation of the desired window.

The main drawback of this configuration is that each computer system hardware resource is only usable by a single application, which is the one the user has (or the one the operating system has selected as) active in the foreground (i.e., the active window), i.e., if the hardware resource is the audio card, out of all the applications being executed at that time, only the application that the user has active in the foreground will be capable of using that resource and, therefore, will be the only application capable of sending audio data to the audio card in order to reproduce it.

A situation in which the hardware resource is capable of receiving data from different applications being executed is also possible, but in that case, the data will be mixed. Therefore, continuing with the audio card example, if this resource can receive audio data from more than one of the applications being executed, the audio card reproduces a mix of the different audio data it receives.

To solve these drawbacks, the invention provides an executable piece of code that must be injected into each application at the time of initiating execution (for example, the process belonging to the application being initiated in the sleep state), which is capable of executing a method for virtualizing one or more hardware resources associated with a computer system on which the application is executed. Therefore, the main objective of this piece of code is to virtualize the hardware resources that the application requires from the computer system for execution, such that it is capable of generating virtualized hardware resources usable only by the application into whose process it has been injected, and managing the data flow between the process belonging to the application and the hardware resource. Therefore, each application being executed has its own virtualized hardware devices, as well as a tool (the piece of code) that is capable of managing the data flows generated between them and the process.

Figure 2:
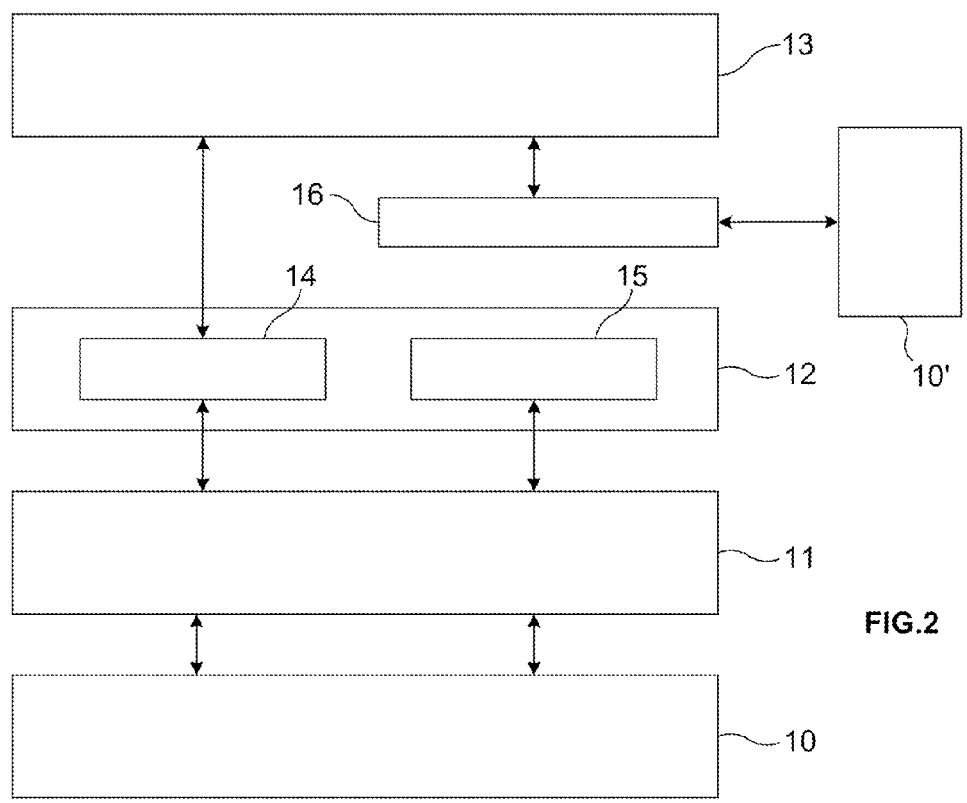
FIG. 2 is a block diagram depicting the layers of execution of an application on a computer system furthermore incorporating a layer representing a piece of code injected into a process belonging to the application, this piece of code being intended for virtualizing at least one hardware resource associated with the computer system on which the application is executed according to the invention.

FIG. 2 shows a diagram based on that of FIG. 1, but it further comprises a layer 16 representing the executable piece of code which, after being injected into the process associated with the application, is arranged at logic level between layer 13 of the application and layer 12 representing the APIs, such that the piece of code can intercept calls from the application to certain API services (for example, functions or methods) and thus virtualize hardware resources 10'.

As can be seen in FIG. 2, the main function of layer 16 representing the piece of code is to intercept different calls that the process belonging to the application makes to API services related with the data flow generated between the process and the computer system hardware resources, and on the basis of the interception of these calls, managing the data flow produced between the process and the computer system hardware resources, as well as between the process and the virtualized hardware resources 10' described above.

Figure 3:
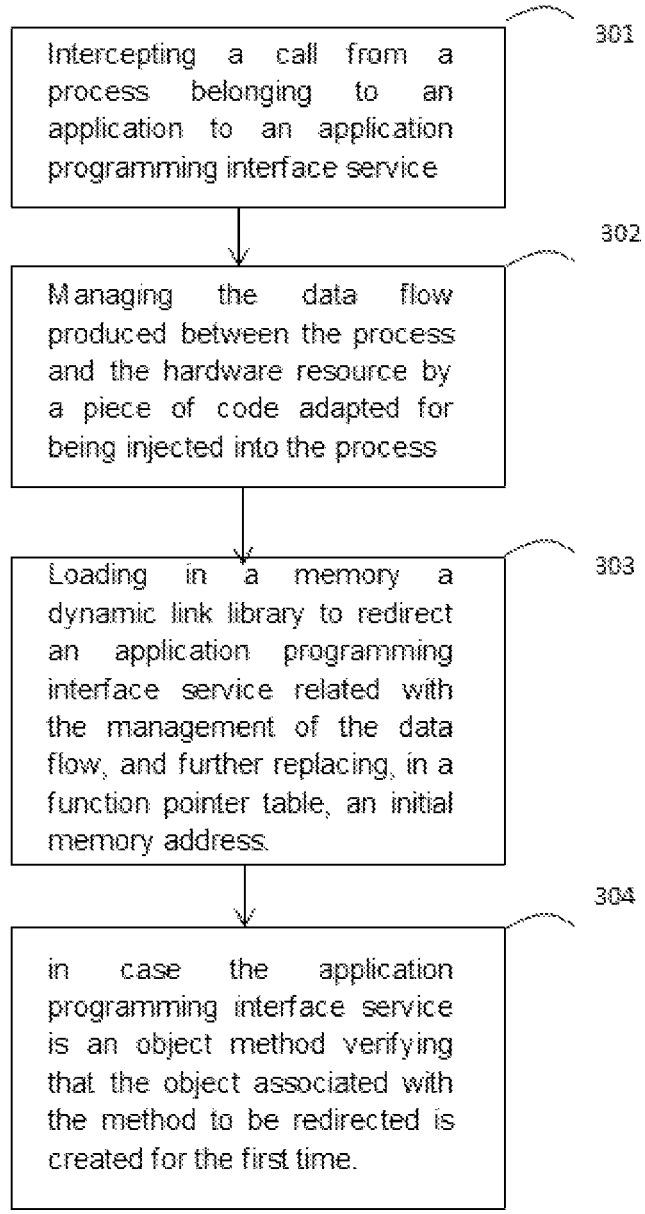
FIG. 3 is a flow chart of steps in a method for the virtualization of a hardware resource associated with a computer system by an executable piece of code adapted for being injected into a process belonging to an application that is executed on an operating system in accordance with the invention.
Figure 4:
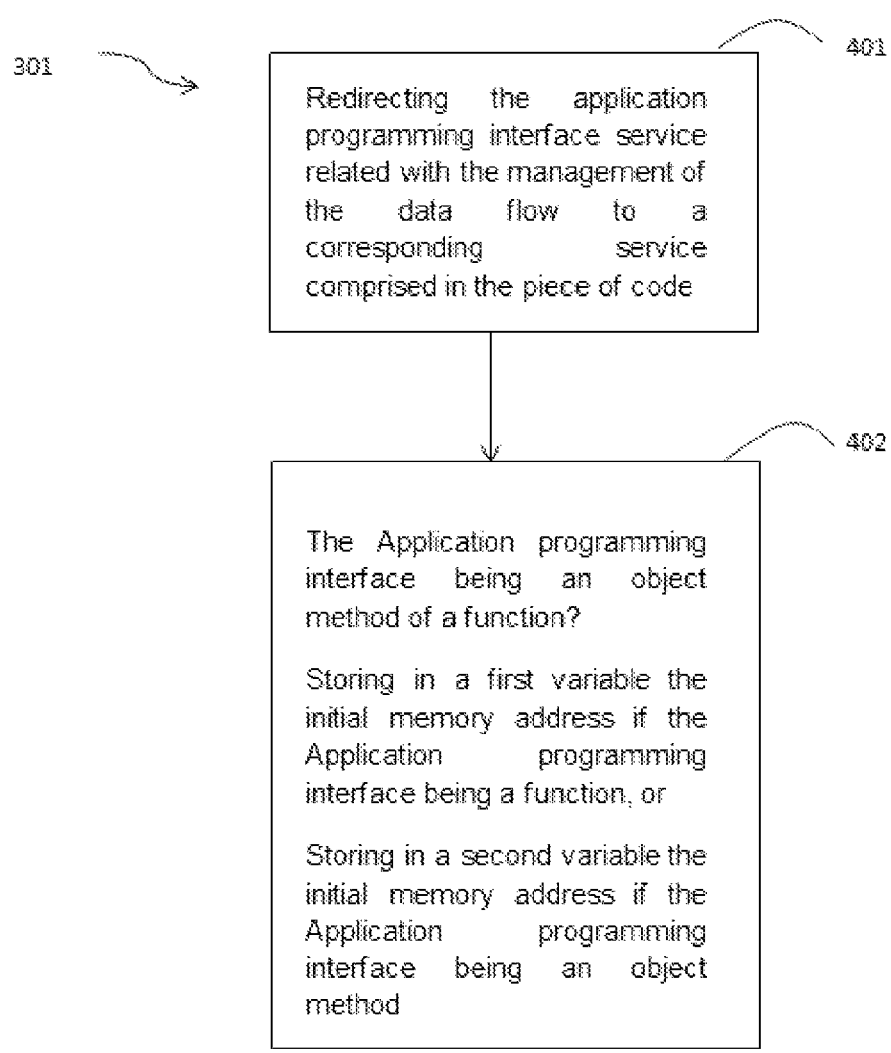
FIG. 4 is a flow chart for performing the step of intercepting a call of FIG. 3.
Figure 5:
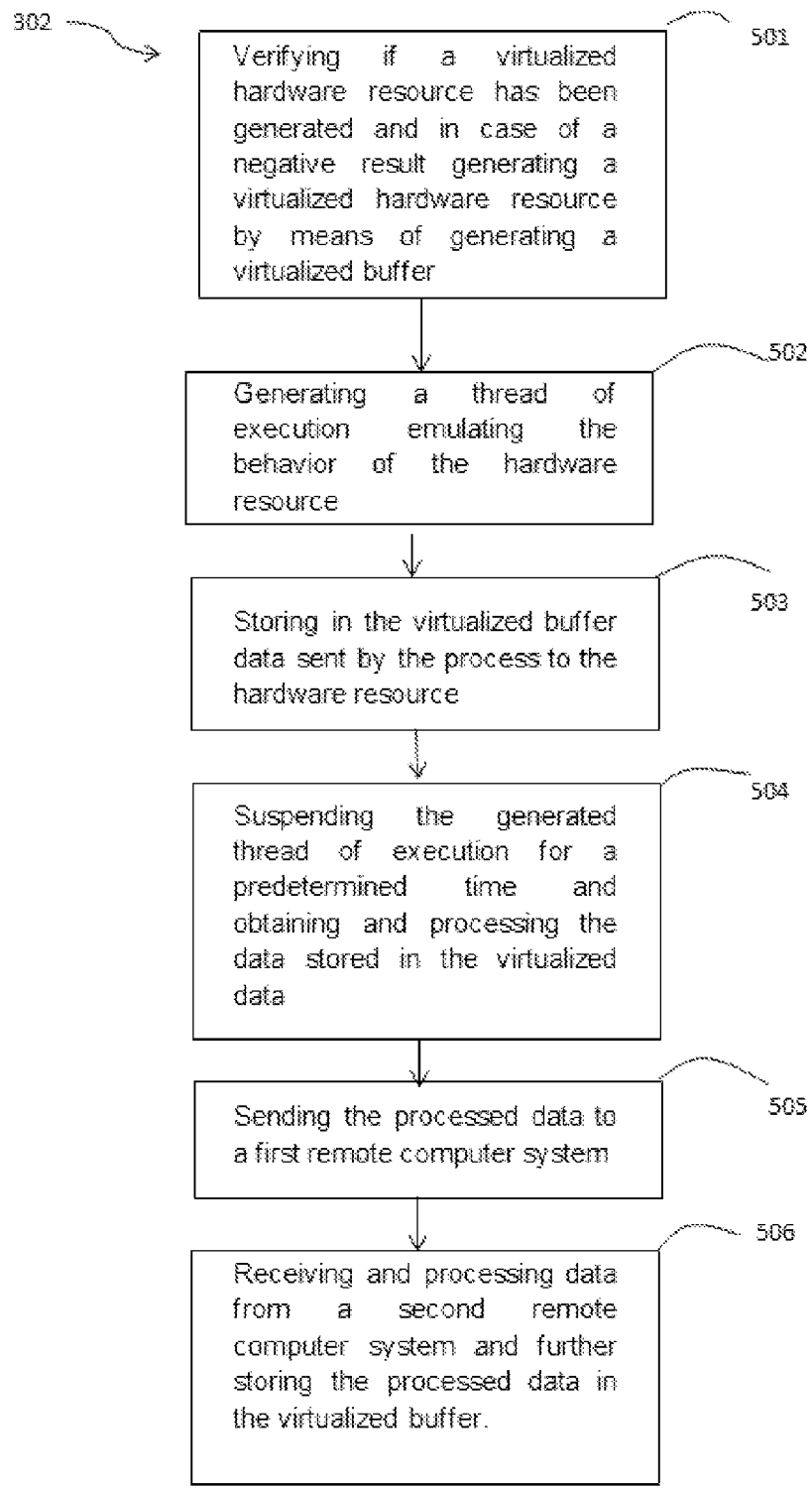
FIG. 5 is a flow chart for performing the step of managing the data flow of FIG. 3.

FIGS. 3-5 set forth steps in accordance with the invention. FIG. 3 sets forth an intercepting a call step 301, a managing the data flow step 302, a loading in a memory step 303 and a verifying step in case the application programming interface service is an object method. FIG. 4 sets forth the intercepting a call step 301 in more detail, i.e., a redirecting step 401 and a step 402 that stores the initial memory address in a first or second variable as applicable based upon whether or not the application programming interface is an object method of a function. FIG. 5 sets forth the managing the data flow step 302 in more detail, i.e., a verifying step 501, a generating a thread of execution step 502, a storing step 503, a suspending, obtaining and processing step 504 a sending of processed data step 505 and a receiving and processing data and further storing step 506.

More specifically, the method executed by the piece of code is as follows. It must be described based on an initial situation in which, when a user executes an application, the process belonging to the application is initiated in the sleep state. During this sleep state, the executable piece of code is injected into the process.

Once the piece of code is injected into the process, this piece of code loads in the memory all those dynamic link libraries containing the application programming interfaces (APIs) containing services (either functions or methods) related with the management of the data flow between the process and the different computer system hardware resources and which are going to be required by the application while it is being executed. Then, after the operating system has filled the service pointer table for the services of the different APIs loaded in the memory according to the initial memory addresses in which these services have been stored, it replaces in this pointer table the initial memory address of each of the services which may or will be required by the application while it is being executed, with the initial memory address in which each of the corresponding services comprised in the piece of code is located. Therefore, on the basis of this redirection performed, the piece of code is capable of intercepting calls that the process makes to these relevant services for execution thereof, i.e., the calls the process makes to the different relevant services of the different APIs are received by the piece of code, since the pointers do not point to the API services but to the corresponding services comprised in the piece of code.

On the basis of said interception, the piece of code acquires the capacity to manage the data flow produced between the process and the computer system hardware resource, i.e., the piece of code takes control, in a manner that is transparent for the process, of the data flow produced between the process and the computer system hardware resource.

More specifically, when the process seeks to access a computer system hardware resource by means of calls to certain API services, the piece of code executes its own services (i.e., it performs an interception of these calls). On the basis of this interception, to take control of the data flow it is necessary to generate a virtualized hardware resource 10' corresponding with the computer system hardware resource to which the process seeks to access, if it had not been previously generated.

Generating the virtualized hardware resource 10' may entail several actions.

A first action can be generating at least one buffer which virtualizes the at least one buffer associated with the computer system hardware resource, i.e., the piece of code reserves a specific memory area, representing the virtualized buffer, in which the process must store the data which, at first, it is sending to the computer system hardware resource, but which have been intercepted by the piece of code.

A second action to be performed can be generating a thread of execution emulating the behavior of the computer system hardware resource. Basically, this thread of execution can be a function comprised in the piece of code itself.

Once the virtualized hardware resource 10' is generated (if it did not previously exist), the piece of code stores the data sent by the process in the virtualized buffer and generates the thread of execution described above (if it is necessary). The piece of code suspends the thread of execution (which is a function comprised in the same piece of code and, therefore, over which it has control) for a predetermined time (approximately a few milliseconds), so that it subsequently reads the data stored in the virtualized buffer (bear in mind said data is from the process) and processes it. Once the data is processed, the piece of code has the capacity to send it to a first remote computer system, although this embodiment will be described below.

It is important to point out that usually it will be necessary for the piece of code to communicate to the process that the data has been correctly received, as would occur if the hardware resource was not the virtualized hardware resource but rather the computer system hardware resource itself.

On the other hand, it is also possible for the generated thread of execution to receive data from a second remote computer system (although the first and second remote computer systems will usually be the same remote computer system). In this situation, the thread of execution processes the received data and, once processed, stores it in the virtualized buffer that is part of the virtualized hardware resource 10'.

At any time while the application is being executed, the process calls a certain API service to verify if the computer system hardware resource has generated data for the application. Since all the API services related with the management of the data flow between the process and the system hardware resources have been redirected, the call is received and processed by the piece of code (more specifically, a service comprised in the piece of code). To that end, the piece of code retrieves the data contained in the virtualized buffer (bear in mind that the data corresponding to the data contained in the virtualized buffer (i.e., the data received and processed by the thread of execution) has been received by the thread of execution of a remote computer system) and sends it to the process so that it can use it.

Usually, given that the computer system hardware resource can generate data for the application (bear in mind that the piece of code intervenes only at the data flow level and not at the control signal level), the piece of code must verify every so often if there is data in the buffer of the hardware resource and, in the event of a positive result, eliminate such data. Therefore, problems are avoided while the application is being executed.

A preferred embodiment of the invention will be described below, in which the operating system is any one from the Windows family, for example Windows 7; the computer system is an application server, more specifically a game server; the applications to be executed are games and/or different instances of one and the same game; and the hardware resource on which a game being executed makes an access request is the audio card of the game server. An embodiment of the invention in which the hardware resource is a video card, an embodiment of the invention in which the hardware resource is a data input device (for example, a keyboard or a mouse), and an embodiment of the invention in which the hardware resource is a hard drive are described below.

More specifically, the present embodiment has the following operation. The objective of the game server is to allow users of the service to play different games or even the same game (for example, computer (PC) or console games) from their mobile terminals or remote computer systems, such as smartphones or tablets. The execution of each game or of each instance of the same game can be sent by means of streaming techniques from the game server to the mobile devices of the users. Therefore, from a mobile device belonging to the user, said user can select the game to be played, requesting execution thereof by means of actuating on a control element (for example, an icon representative of the game) appearing on a graphic user interface shown on the screen of the user's mobile terminal. This actuation by the user on the control element generates a control signal to the game server causing the execution of the selected game on the server.

Given that there may be a large number of users requesting the execution of a game (i.e., there may be a large number of games being executed), the purpose of the present invention is for each game, on the basis of the piece of code injected therein, to be able to virtualize the game server hardware resources required for execution and to thus have them available on an exclusive basis.

When a user requests the execution of a game from his/her mobile terminal, the main process of the application being executed (i.e., the game) is created in the game server, in the sleep state. To that end, the function CreateProcess is used, assigning the CREATE_SUSPENDED value to the creation mode parameter (CreateFlags). Once the process has been initiated in the sleep state, the executable piece of code according to the invention is injected into the process, the objective of which is to virtualize the game server hardware resources.

At this point it is important to point out that the expression "virtualize a hardware resource" entails not only generating a virtualized hardware resource corresponding with the computer system hardware resource, but also comprises the entire management of the data flow that is generated a posteriori.

Before resuming execution of the process (it must be borne in mind that the process is initiated in the sleep state), the injected piece of code redirects the API functions related with the management of the data flow produced between the application (or more specifically the process belonging to the application) and the different game server hardware resources (in the present embodiment, at least those functions intended for managing the data flow between the application and the audio card would be loaded). Thus, for example, in the present embodiment functions of interest could be IAudioClient or IAudioRenderClient.

Given that in the present embodiment the operating system that is executed on the game server is one from the Windows family (more specifically, Windows 7), these described APIs are usually implemented in dynamic link libraries (DLLs). For this reason, the piece of code loads, by means of the LoadLibrary function, the library or libraries containing the functions of interest, for example, GetBuffer and ReleaseBuffer of the IAudioRenderClient API, through the dxgi.dll library. Basically, LoadLibrary loads the library in the memory and the operating system fills the Index Address Table (IAT), which is a function pointer table for API functions, with the initial addresses in the memory of the API functions. By means of the RedirectIAT function, the piece of code modifies the necessary pointers, making them correspond to the functions comprised in the piece of code injected into the process. At the same time, the original content of the table, i.e., the initial value of the pointers before the modification is saved in a variable in case the piece of code has to call any of the redirected original functions at any time.

When interception ends, i.e. when all the functions of all the APIs necessary have been redirected, the piece of code resumes execution of the process that has been initiated in the sleep state.

On the other hand, when the process requests the creation of an IAudioRenderClient-type interface (a COM-type interface) by means of the GetService method of the IAudioCLient interface, the piece of code verifies whether or not this interface has already been modified (i.e., redirected) by the piece of code. In the event of a negative result in the verification, it is necessary to modify the pointer table of the interface for replacing the methods to be intercepted, such as, for example, IAudioRenderClient GetBuffer and ReleaseBuffer. The method pointer table for methods of a COM-type interface is modified with a specific code. For example, GetBuffer corresponds to position 4 of the method table of the IAudioRenderClient interface and it has to be modified so that it points to the function comprised in the injected piece of code. At the same time, the original content of this position is saved in a variable in case there is a need to call the original method. As discussed, the modification of the pointer table of a COM-type interface only has to be performed the first time an object of that type is created.

Once the interface IAudioRenderClient has been created and intercepted by the injected piece of code into the game trying to access the audio card, the piece of code returns the corresponding IAudioRenderClient object to the process.

When the process belonging to the application calls the IAudioRenderClient GetBuffer method to request a buffer in which the audio data for the audio card can be written (more specifically, it requests the address of the memory area in which it has to write the audio data), the piece of code intercepts this call (it must be borne in mind that the GetBuffer method is redirected to a corresponding method comprised in the piece of code, so the process actually calls the corresponding method comprised in the piece of code). The corresponding method comprised in the piece of code calls the original method of the API (although the piece of code could comprise the entire method) and generates a buffer which virtualizes the buffer associated with the audio card, i.e., the method passes an address of a memory area in which the application is to write the audio data to the process. Therefore, the process does not store the audio data in the buffer of the game server audio card but rather in the virtualized buffer corresponding with the buffer of the actual card.

Once the application writes all the audio data in the virtualized buffer, it makes a call to the ReleaseBuffer function to indicate that it has just finished writing the audio data and how much it has written. This call is again intercepted by the piece of code, such that it is possible to know when all the audio data has been written in the virtualized buffer and how much audio data has been written.

Furthermore, due to issues relating to control of the application by the audio card, the piece of code sends a buffer of the same size to the audio card, which only comprises silence. Therefore, the piece of code makes certain that the audio card continues to correctly control the application.

In parallel to what has been described, the piece of code generates a thread of execution simulating the behavior of the game server audio card. It is important to indicate that this thread of execution is no more than a function comprised in the same piece of code. The piece of code suspends execution of the thread for about a few milliseconds, either synchronously or asynchronously. After the suspension, the thread of execution reads the audio data from the process stored in the virtualized buffer, processes it and sends it to the mobile terminal for reproduction.

Processing the audio data can comprise mixing different audio data (for example, the background music heard while executing the game and the audio heard due to intervention of the user on the game (for example, shots, car engines, swords, etc.)) and can convert it into a suitable audio format such as mp3 (according to the MPEG-1 Audio layer III standard). Once the audio data has the correct format, the piece of code sends it to the mobile terminal over any communications network (for example, Internet) so as to be reproduced while the user enjoys the game.

In the present preferred embodiment, a request by a game to access the audio card has been described. Actually, a plurality of games and/or a plurality of instances of one and the same game can be executed concurrently on the game server, so each of them should comprise an injected piece of code for executing the described method.

In the event that the hardware resource to be virtualized by the game is the game server video card, and based on a situation in which the main process of the game at hand was initiated in the sleep state, and in which the piece of code has been injected into the process, the method for the virtualization of the video card is as follows.

As in the case of the other hardware resources, before resuming execution of the process the injected piece of code redirects the necessary API functions, in this case, for example, the ShowWindow or CreateDevice function of the DirectX API. Again, the main objective of this method is for the piece of code to take over, in a transparent manner, the management of the data flow produced between the video card and the process belonging to the application.

As discussed above, these APIs are implemented within dynamic link libraries (in the present embodiment in which the operating system is one from the Windows family, these libraries are DLLs). Therefore, the piece of code loads, by means of the LoadLibrary function, the library or libraries comprising the functions to be redirected, for example the ShowWindow function, through user32.dll library. Once loaded, and after the operating system has filled the Index Address Table (IAT) with function pointers for the API functions on the basis of the initial memory addresses in which these functions are stored, by means of the RedirectAIT function, the piece of code modifies the pointers of those functions that may be of interest for virtualizing the video card. To that end, it replaces the initial memory addresses in which these API functions are stored with the initial memory addresses in which the corresponding functions comprised in the piece of code are stored. Alternatively, the IAT could also be modified with specific code if necessary.

On the other hand, for redirecting the services of the COM-type interfaces such as IDirect3DDevice9, it is necessary to modify the pointer table of the interface to replace the relevant methods. The method pointer table for methods of a COM-type interface is modified with a specific code. Thus, for example, Present corresponds to position 18 of the method table for methods of the IDirect3DDevice9 interface and it has to be modified so that it points to the corresponding function comprised in the piece of code. At the same time, the original content of this position is saved in a variable in case the original method has to be called from the piece of code. The modification of the pointer table of a COM-type interface only has to be modified the first time an object of that type is created. When interception ends, i.e., all the functions of all the APIs necessary for performing the virtualization of resources have been redirected, the piece of code takes responsibility for resuming execution of the process of the application.

When the process requests that a window where graphs are going to be drawn is shown or requests the creation of an IDirect3DDevice9-type interface by means of the CreateDevice function of the DirectX API, these calls are intercepted in order to capture or virtualize the Drawing Context (DC) (in this case it can be done with the original DC or a virtualized DC can be provided). The DC can be defined as a memory area in which the video card will store the resulting graphs frame-by-frame and it is always associated with a window in Windows. Therefore, for the virtualization of the game server video card, this area must be accessed by means of the getDC function. The access to this DC is mutually exclusive, i.e., if the video card is accessing this memory area, no thread of execution of any process can access it.

Once the application has created the IDirect3DDevice9 interface or has at least shown the window where the graphs will be shown, it starts sending the necessary data to the video card so as to start the entire processing of this information and the resulting frame is created. This is independent of the piece of code.

Every so often, the thread of video virtualization captures the DC content. It can do this in a synchronous manner or in an asynchronous manner with the application.

In a synchronous manner means that when the process makes a request to access the video card by invoking the Present method of the IDirect3DDevice9 interface so that it shows the generated frame, the piece of code intercepts this Present method. At that time, the thread of execution accesses the DC (in this case it is called BackBuffer) in order to capture the generated frame. Subsequently, if necessary, the piece of code calls the original Present method of the interface. This method is synchronized because there is a point, when the Present method is called, at which the piece of code knows perfectly well that the work to be done in order to draw the frame has ended.

In an asynchronous manner consists of directly accessing the DC of the window (where the video card leaves the result of generating the frame) to access the content. It must be taken into account that access to this DC has to be done in a mutually exclusive manner. To that end, the thread of execution tries to gain access, by means of a survey, to this mutually exclusive area. When it does, it accesses the DC content in order to capture the result of the generated frame. This method is asynchronous since the rate of frame capture and the rate of frame generation do not have to be the same.

In any of the two methods, as soon as the DC content, i.e., the frame, has been captured, processing of this information begins, and it can be based on coding by means of a suitable codec, such as H.264 for example, and sending this coding over the Internet.

In the event that the hardware resource is a data input element, such as a mouse or keyboard, the specific method is as follows. Unlike what has been described up until now, this method manages a data flow going from the data input element to the process belonging to the application, i.e., the method seeks to send orders from the user enjoying the game (for example, through the touch screen or from the keyboard of the mobile terminal) to the game that is being executed on the game server for the development thereof.

Therefore, on the basis of a situation in which the piece of code has already been injected into the process (i.e., into the game), the piece of code has redirected the relevant services and generated the virtualized hardware resource (i.e., it has generated a buffer which virtualizes the buffer of the data input element, as well as a thread of execution emulating the behavior of the data input element), the piece of code (more specifically, the thread of execution simulating the behavior of the input element) receives data from the user's mobile terminal, which data has to be sent to the process so that it can modify, for example, the data referring to audio and to video, which it will subsequently send to the mobile terminal. To that end, depending on the input element from which the data is received, the piece of code stores this received data in the corresponding virtualized buffer (either the one corresponding to that of the virtualized keyboard or that of the virtualized mouse).

When the process makes a call to the corresponding service for obtaining data from the input element (the actual keyboard mouse, i.e., the one associated with the game server), the piece of code intercepts this call and causes the execution of the corresponding service comprised in the piece of code, such that this service reads the data stored in the virtualized buffer and not in the buffer of the actual input element.

Taking into account that the operating system of the present preferred embodiment is one from the Windows family, it is necessary to take Windows Messages into account. In this case, the thread of execution emulating the message queue receives the data inputs (for example keyboard or mouse) from the remote system (i.e., the mobile terminal) through the network (for example Internet). This data can be orders and/or events the user sends from the mobile terminal. Therefore, for each data input the thread of execution introduces a message in the message queue (by means of the SendMessage and PostMessage functions of the user32.dll library) associated with the window of the application. This message queue queries the application automatically by means of the message queuing system mechanism offered by the operating system. Furthermore, in order to complete the virtualization of the message queue, it may be necessary to change the query and treatment function of the message queue (by means of the SetWindowLongPtr function of the user32.dll library) so that, instead of executing the original message treatment function of the message queue (also known as window function or method, which is a function that the programmer defines to determine the behavior of the application in response to a certain message), a function of the piece of code is executed. In other words, the window function or method of the window corresponding to the application is intercepted. Said function of the piece of code can: eliminate those messages that are not to be treated by the original function of the window of the application (i.e., no action is carried out in response to the message) and therefore getting the application to ignore said messages since the original function never actually treats them; or, from the function of the piece of code, call the original message treatment function, since the application is to react in response to these messages both because they are messages that have been introduced by the thread of execution of the piece of code emulating the virtualized hardware resource entering data (keyboard or mouse) on the basis of orders sent by the mobile terminal, and because they are messages that do not alter the behavior of the application from the mobile terminal user's perspective (the window has been moved on the screen of the actual computer system, but this position is completely irrelevant for the remote system user).

Finally, in the event that the hardware resource on which the process makes the request for access is a storage unit, such as a hard drive, the method is as follows. In this case, the piece of code is assumed to have already been injected into the process.

Before resuming the execution of the process (bear in mind that in the present preferred embodiment the process is initiated in the sleep state), the injected piece of code redirects all the API functions required, for example CreateFile and CreateDirectory. The main objective is for the piece of code to take control of the data flow between the process and the hard drive.

As discussed for the remaining hardware resources, since these APIs are implemented in dynamic link libraries, the piece of code must load them in the memory by means of the LoadLibrary function. Therefore, LoadLibrary loads the library containing the functions to be redirected, for example CreateFile and CreateDirectory of the kernel32.dll library. The operating system then fills the IAT with the initial memory address in which each of the API functions is stored. The necessary pointers are modified by means of the RedirectIAT function, making such pointers point to the corresponding functions comprised in the piece of code. When the piece of code finishes redirecting the functions relevant for the management of the data flow between the process and the hard drive, the piece of code itself is responsible for resuming the execution of the process belonging to the application that was initiated in the sleep state.

When the process wants to create and/or open a file by means of the CreateFile function, the piece of code intercepts this request and executes the corresponding function comprised in the piece of code. On the basis of the interception, this function verifies if the file to be opened by the process is a file for the round of the game or is any other file. In the event that it is a file for the round, the function modifies, if necessary, the file path to be created and/or opened by means of any kind of algorithm. Once the path has been modified, the original CreateFile function is executed with the new path created, although a corresponding function comprised in the piece of code could also be executed. The method for creating a directory by means of the CreateDirectory function is equivalent to that described for the CreateFile function.

Obviously, in the present preferred embodiment the virtualization of each hardware resource has been described separately. In the event that one and the same piece of code is capable of virtualizing several hardware resources, the first steps of the method, for example, the step of loading in the memory the different dynamic link libraries or the step of replacing the pointers to services, can be common, i.e., all the dynamic link libraries comprising APIs with relevant services for all the hardware resources that the piece of code is capable of virtualizing can be loaded in the memory at the same time, and the pointers of all the services to be redirected so that the piece of code can virtualize all the hardware resources that it is capable of virtualizing can be replaced.

Although a specific embodiment of the present invention has been described and depicted, it is obvious that the person skilled in the art may introduce variants and modifications or replace the details with other technically equivalent details without departing from the scope of protection defined by the attached claims.

Although the embodiments of the invention described with reference to the drawings comprise computer systems and processes carried out in computer systems, the invention also covers computer programs, more particularly computer programs in or on carrier media, suitable for putting the invention into practice. The computer program can be in the form of a source code, an object code or of an intermediate code between a source code and an object code, such as in a partially compiled form, or in any other form suitable for use in the implementation of the processes according to the invention. The carrier medium can be any entity or device capable of carrying the program.

For example, the carrier medium can comprise a storage media, such as a ROM, for example a CD ROM or a semiconductor ROM, or a magnetic recordable medium, for example a floppy disc or a hard disc. Furthermore, the carrier medium can be a transmissible carrier medium such as an electrical or optical signal that can be transmitted through an electrical or optical cable or by means of radio or other means.

When the computer program is contained in a signal that can be directly transmitted by means of a cable or another device or means, the carrier medium can be formed by said cable or another device or means.

Alternatively, the carrier medium can be an integrated circuit in which the computer program is embedded, said integrated circuit being suitable for carrying out or for being used in carrying out the relevant processes.

The invention claimed is:

1. A method for the virtualization of a hardware resource associated with a computer system by an executable piece of code adapted for being injected into a process belonging to an application that is executed on an operating system comprising at least one application programming interface that is executed on the computer system, the method comprising: intercepting a call from the process belonging to the application to an application programming interface service related with the management of a data flow produced between the process and the hardware resource, the intercepting comprising at least redirecting an application programming interface service related with the management of the flow produced between the process and the hardware resource to a corresponding service comprised in the piece of code; and managing the data flow produced between the process and the hardware resource by the piece of code on the basis of the interception of the call from the process to the application programming interface service related with the management of the data flow produced between the process and the hardware resource, wherein the application interface service is: a function; or an object method, and wherein redirecting an application programming interface service related with the management of the data flow produced between the process and the hardware resource to a corresponding service comprised in the piece of code comprises: loading in the memory a dynamic link library comprising the application programming interface function or object method to be redirected; replacing, in a function pointer table for the application programming interface functions or object methods comprised in the loaded dynamic link library, the initial memory address in which the application programming interface function or object method to be redirected is stored with the initial memory address in which the corresponding function or object method comprised in the piece of code is stored, wherein the replacing, in case the application programming interface service is an object method is performed after having verified that the object associated with the method to be redirected is created for the first time.

2. The method according to claim 1, wherein the application programming interface service is a function and wherein redirecting an application programming interface service related with the management of the data flow produced between the process and the hardware resource to a corresponding service comprised in the piece of code comprises: storing in a first variable the initial memory address in which the application programming interface function to be redirected is stored.

3. The method according to claim 1 wherein the application programming interface service is an object method and wherein redirecting an application programming interface service related with the management of the data flow produced between the process and the hardware resource to a corresponding service comprised in the piece of code comprises: storing in a second variable the initial memory address in which the object method to be redirected is stored.

4. The method according to claim 1, wherein intercepting a call from the process belonging to the application to an application programming interface service related with the management of the data flow produced between the process and the hardware resource comprises: receiving a call from the process to the service comprised in the piece of code corresponding to the application programming interface service related with the management of the data flow produced between the process and the hardware resource.

5. The method according to 1, wherein the process belonging to the application was initiated in the sleep state, and it comprises: resuming the execution of the process belonging to the application that is in the sleep state.

6. The method according to claim 1, wherein managing the data flow produced between the process and the hardware resource comprises: verifying if a virtualized hardware resource corresponding with the hardware resource has been generated; and in the event of a negative result in the verification, generating the virtualized hardware resource.

7. The method according to 6, wherein generating the virtualized hardware resource comprises: generating a buffer which virtualizes the buffer associated with the hardware resource.

8. The method according to claim 7, wherein generating the virtualized hardware resource comprises: generating a thread of execution emulating the behavior of the hardware resource.

9. The method according to 8, wherein managing the data flow produced between the process and the hardware resource comprises: storing in the virtualized buffer the data sent by the process to the hardware resource.

10. The method according to claim 9, wherein managing the data flow produced between the process and the hardware resource comprises: suspending the generated thread of execution emulating the behavior of the hardware resource for a predetermined time; obtaining the data stored in the virtualized buffer, previously sent by the process to the hardware resource; and processing the obtained data.

11. The method according to 10, wherein managing the data flow produced between the process and the hardware resource comprises: sending the processed data to a first remote computer system.

12. The method according to 6, comprising: managing the data flow produced from the virtualized hardware resource to the process belonging to the application.

13. The method according to claim 11, comprising: managing the data flow produced from the virtualized hardware resource to the process belonging to the application, comprising: receiving data from a second remote computer system; processing the received data; and storing the processed data in the virtualized buffer.

14. The method according to claim 13, wherein intercepting a call from the process belonging to the application to an application programming interface service related with the management of the data flow produced between the process and the hardware resource comprises: intercepting a call from the process belonging to the application to an application programming interface service related with the management of the data flow produced from the hardware resource to the process; and wherein managing the data flow produced from the virtualized hardware resource to the process belonging to the application comprises: retrieving the data stored in the virtualized buffer; and sending the retrieved data to the process.

15. The method according to claim 12, wherein intercepting a call from the process to an application programming interface service related with the management of the data flow produced from the hardware resource to the process comprises: receiving a call from the process to the service comprised in the piece of code corresponding to the application programming interface service related with the management of the data flow produced from the hardware resource to the process.

16. The method according to 13, wherein managing the data flow produced between the process and the hardware resource comprises: managing the data flow produced from the hardware resource to the process, comprising: verifying if there is data from the hardware resource in the buffer; and in the event of a positive result in the verification, eliminating this data.

17. A computer system on which an operating system comprising at least one application programming interface is executed, on which operating system at least one application is executed, the computer system comprising a memory and at least one processor, this memory storing processor-executable instructions corresponding to an executable piece of code injected into a process belonging to the application, the instructions comprising functionalities for: intercepting a call from the process belonging to the application to an application programming interface service related with the management of a data flow produced between the process and the hardware resource, wherein the intercepting at least comprises redirecting an application programming interface service to a corresponding service comprised in the piece of code; and managing the data flow produced between the process and the hardware resource by the piece of code on the basis of the interception of the call from the process to the application programming interface service related with the management of the data flow produced between the process and the hardware resource, wherein, the application programming interface service is: a function; or an object method, and wherein redirecting an application programming interface service related with the management of the data flow produced between the process and the hardware resource to a corresponding service comprised in the piece of code comprises: loading in the memory a dynamic link library comprising the application programming interface function or object method to be redirected; replacing, in a function pointer table for the application programming interface functions or object methods comprised in the loaded dynamic link library, the initial memory address in which the application programming interface function or object method to be redirected is stored with the initial memory address in which the corresponding function or object method comprised in the piece of code is stored, wherein the replacing, in case the application programming interface service is an object method is performed after having verified that the object associated with the method to be redirected is created for the first time.

18. The method according to claim 17, wherein at least two applications are executed on the operating system, and wherein the memory stores processor-executable instructions corresponding to a piece of code for each application being executed.

19. A computer program product stored in a non-transitory computer readable medium that can be executed on an operating system that is executed on a computer system, comprising an executable piece of code including instructions adapted for executing a method for virtualizing a hardware resource associated with a computer system, the method comprising: intercepting a call from the process belonging to the application to an application programming interface service related with the management of a data flow produced between the process and the hardware resource, the intercepting comprising at least redirecting an application programming interface service related with the management of the data flow produced between the process and the hardware resource to a corresponding service comprised in the piece of code; and managing the data flow produced between the process and the hardware resource by the piece of code on the basis of the interception of the call from the process to the application programming interface service related with the management of the data flow produced between the process and the hardware resource, wherein, the application programming interface service is: a function; or an object method, and wherein redirecting an application programming interface service related with the management of the data flow produced between the process and the hardware resource to a corresponding service comprised in the piece of code comprises: loading in the memory a dynamic link library comprising the application programming interface function or object method to be redirected; replacing, in a function pointer table for the application programming interface functions or object methods comprised in the loaded dynamic link library, the initial memory address in which the application programming interface function or object method to be redirected is stored with the initial memory address in which the corresponding function or object method comprised in the piece of code is stored, wherein the replacing, in case the application programming interface service is an object method is performed after having verified that the object associated with the method to be redirected is created for the first time.

* * * * *